United States Patent Office 3,383,857
Patented May 21, 1968

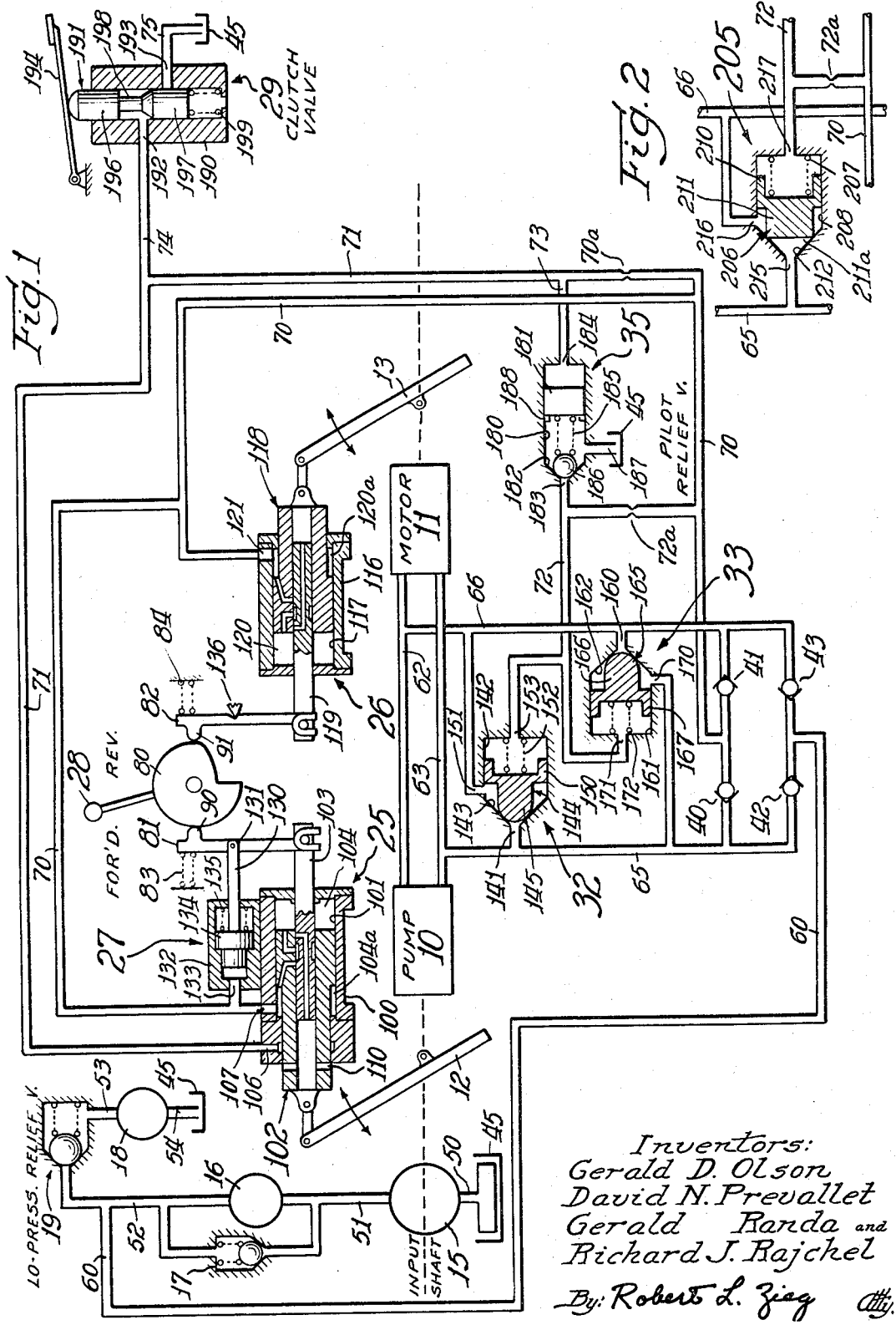

3,383,857
HYDROSTATIC TRANSMISSION MECHANISM
Richard J. Rajchel, Fort Wayne, and David N. Prevallet, Gerald D. Olson, and Gerald Randa, Auburn, Ind., assignors to Borg-Warner Corporation, Chicago, Ill., a corporation of Illinois
Filed May 24, 1966, Ser. No. 552,496
6 Claims. (Cl. 60—53)

ABSTRACT OF THE DISCLOSURE

An hydraulic transmission mechanism including pump and motor units having a commonly controlled pair of servovalve mechanisms for controlling capacity of the pump and motor units and having a pair of relief valves wherein at least one of said relief valves will be initially open interconnecting the high and low pressure passages between the pump and motor units and as the pressure developed by the pump builds up the relief valve will close at a controlled rate to prevent shock loads in the hydraulic circuit between pump and motor units.

---

The invention consists of the novel constructions, arrangements and devices to be hereinafter described and claimed for carrying out the above stated objects and such other objects as will appear from the following description of preferred embodiments of the invention illustrated with reference to the accompanying drawing wherein:

FIGURE 1 is a schematic view of the transmission mechanism of the present invention, and FIGURE 2 is a schematic view of a modified form of relief valve for the transmission.

The transmission of the present invention includes the following general components: a pump unit 10 of the axial piston type, a motor unit 11 of the axial piston type, a swash plate 12 for the pump unit 10 and a swash plate 13 for the motor unit 11, a charge pump 15, a filter 16, a filter bypass valve 17, a heat exchanger 18, a low pressure relief valve 19.

The transmission further includes a servo valve 25 for controlling the swash plate of the pump unit, a servo valve 26 for controlling the swash plate motor unit, a pressure compensating mechanism 27, a mannual control lever 28, a clutch valve 29, relief valves 32 and 33, a pilot relief valve 35 and check valves 40, 41, 42 and 43.

A sump 45 is provided for the transmission and is schematically represented. A conduit 50 interconnects charge pump 15 and sump 45. A conduit 51 connects the charge pump with filter bypass valve 17 and filter 16. A conduit 52 connects the filter bypass valve and the filter to a low pressure relief valve 19, a conduit 53 interconnects a low pressure relief valve 19 and heat exchanger 18, a fluid pressure conduit 54 interconnects heat exchanger 18 and sump 45. A fluid pressure conduit 60 is connected to conduit 52 and to check valves 42 and 43. The relative positions of the filter, heat exchanger and low pressure relief valve may be altered, depending upon the particular application in which the transmission is used.

Pressure passages 62 and 63 interconnect the pump and motor units and, depending upon the rotation of the motor unit and the setting of the swash plates, one of the passages 62 or 63 will be at high pressure having the pump outlet pressure therein and the other passage will be the low pressure passage returning fluid from the motor unit to the pump unit. A fluid pressure conduit 65 connects pressure passage 63 to relief valve 32, relief valve 33, check valve 40 and check valve 42. A fluid pressure conduit 66 connects pressure passage 62 to relief valve 32, relief valve 33 and check valves 41 and 43. A fluid pressure conduit 70 interconnects the check valves 40 and 41 with servo valves 25 and 26. A branch conduit 71 connects conduit 70 with servo valve 25. A branch conduit 72 connects pilot relief valve 35 to conduit 70 through an orifice 72A. A branch conduit 74 connects fluid conduit 71 with clutch valve 29. A conduit 75 connects clutch valve 29 with sump 45.

Manual control lever 28 has a cam 80 connected thereto which is rotatable by manual control lever 28. Engageable with the cam 80 is an actuating arm 81 and an actuating arm 82. A spring 83 urges actuating arm 81 into engagement with cam 80 and a spring 84 urges actuating arm 82 into engagement with cam 80. The actuating arm 81 has a contact portion 90 in contact with cam 80 and actuating arm 82 has a contact portion 91 thereon contacting cam 80.

The servo valve 25 includes a cylinder 100 having a bore 101. Slidable within bore 101 is a servo piston 102. Servo piston 102 is connected to swash plate 12 to vary the angle thereof. Slidable within servo piston 102 is a pilot valve 103. Pilot valve 103 is connected to actuating arm 81 to be moved thereby. Formed within the servo valve 25 are pressure chambers 104 and 104a, a port 106 is provided in cylinder 100 connected to conduit 70. A port 107 is provided in cylinder 100 connected to conduit 71. An exhaust passage 110 is provided in servo piston 102.

Servo control valve 26 includes a cylinder 116 having a bore 117 therein, a servo piston 118 is slidable within bore 117 and is connected to swash plate 13 to vary the angle of the swash plate. Mounted within servo piston 118 and slidable with respect thereto is a pilot valve 119, pilot valve 119 being connected to actuating arm 82 to be moved thereby. Pressure chambers 120 and 120a are provided in cylinder 116. A port 121 in cylinder 116 is connected to conduit 71.

Pressure compensating mechanism 27 includes an actuating rod 130 which has an end portion 131 serving as a pivot point for actuating arm 81. A cylinder 132 is provided within which is mounted a piston 134 which is connected to actuating arm 130. The cylinder 132 has a port 133 therein connected to conduit 71. A spring 135 is mounted within cylinder 132 which urges piston 134 to the left as viewed in the drawing. A pivot 136 is provided for actuating arm 82.

The operation of the servo valves 25, 26 may be generally described in that movement of the pilot valves, for example pilot valve 103 will connect the pressure in conduit 70 and pressure chamber 104a to the pressure chamber 104 to move servo piston 102 to the left for example until the connection between conduit 70 and pressure chamber 104 is interrupted thus the servo pistons 110 and 118 will follow exactly the axial movement of the pilot pistons 103 and 119. For a more complete description of the construction and operation of servo valves 25 and 26 reference may be had to U.S. Patent No. 3,241,317, issued Mar. 22, 1966 of common assignee.

Relief valve 32 includes a bore 142, a seat 143, and a piston 144 slidable within bore 142. Piston 144 has a spherical nose portion 145 engageable with seat 143 to block entrance of fluid pressure into valve 32 through a port 141. The piston 144 also includes an enlarged section 150 which contacts the bore 142. A port 151 is provided in the relief valve 32 which is connected to conduit 66. A light spring 152 is provided which engages piston 144 and lightly holds the piston 144 to the left in engagement with seat 143. A port 153 connects relief valve 32 with conduit 72. Relief valve 33 includes a port 160 connected to conduit 66. Relief valve 33 is provided with a bore 161 and a seat 162. A piston 165 is provided which is slidable within bore 161. Piston 165 includes a spherical nose portion 166 engageable with seat 162 and an enlarged portion 167 which contacts bore 161. A second port 170 is provided which connects relief valve 33 with conduit 65 and a third port 171 is provided which connects relief valve 33 with conduit 72. A light spring 172 is included within relief valve 33 which lightly holds the piston 165 in engagement with seat 162.

Pilot relief valve 35 includes a bore 180 having a piston 181 slidable therein. The pilot relief valve 35 is provided with a seat 182 and includes a port 183 connected to conduit 72 and a port 184 connected to conduit 73. A spring 185 is mounted between piston 181 and a ball 186 which is engageable with the seat 182. A conduit 187 connects the valve 35 to the sump 45. A stop 188 is provided in valve 35 to limit the movement of piston 181 to the left.

Clutch valve 29 includes a cylinder 190 having a piston 191 slidable therein; a port 192 is provided in the cylinder 190 connected to conduit 74 and a port 193 is provided in cylinder 190 connected to conduit 75. A foot pedal 194 is provided for manual actuation of the piston 191. The piston 191 includes lands 196 and 197 separated by a groove 198. A spring 199 urges the piston upward in the cylinder 190 as viewed in the drawing to a position blocking flow between conduits 74 and 75. Depression of the foot pedal 194 will open communication between conduits 74 and 75 and reduce the pressure in conduits 71 and 73 acting on pilot relief valve piston 181 due to the presence of orifice 70a in conduit 70.

The operation of the transmission of the present invention is as follows: the charge pump 15 is driven by the engine of the vehicle in which the transmission is installed and supplies fluid pressure to conduit 60 through the filter 16 or the filter bypass valve 17. Fluid pressure in conduit 60 will flow through check valves 42 and 43 to initially supply fluid pressure to each of the passages 62 and 63 interconnecting the pump and motor units. Fluid pressure will also flow from conduits 65 and 66 through check valves 40 and 41 into conduit 70.

If the manual lever is at this time in the neutral position pilot valve 103 will be in a position in which the servo valve piston 102 will have port 110 aligned with port 106 thus dumping pressure in conduits 71 and 73 which will permit pilot relief valve piston 181 to be in its right hand position thereby putting minimum spring force on ball 186. If the manual lever 28 is moved counterclockwise toward the forward position as illustrated in the drawing contact portion 90 on actuating arm 81 will move toward the center of the cam 80 and pilot valve 103 will be moved to the left moving servo piston 102 to the left and increasing the swash plate angle for pump 10. Pump 10 will thus begin pumping fluid through pressure passage 63 for example, to the motor 11.

At this time the pressure in conduit 72 is at a minimum due to relief action of pilot relief valve 35 thus allowing piston 144 of relief valve 32 to be moved to the right by fluid pressure at port 141 and interconnect passage 63 with passage 62 to initially impose a minimum load on the pump to allow smooth acceleration of the motor. The pressure in conduit 70 is felt also in conduit 71 and hence, also in conduit 73 and as the pressure developed by the pump increases it will act on pilot relief valve piston 181, moving the piston to the left increasing the spring force on ball 186. This increases the pressure in passage 72 which in turn applies pressure to piston 144 of relief valve 32 causing a higher pressure in passage 63. The increased pressure in passage 63 is transmitted to conduit 70 which adds more pressure on piston 181. This increase in loading continues until the pressure in passage 63 is increased to the pressure required to match the torque load of the motor. At this point, relief valve 32 is completely closed, and pilot relief valve 35 will be at its maximum setting as determined by stop 188.

As the manual control lever 28 is moved further toward the forward position the pilot piston 103 will be moved further to the left moving servo piston 102 to the left to increase the swash plate angle of the pump and as the swash plate angle is increased, and thereby the pump displacement, the speed of the motor will thus increase. Pressure in conduit 70 is conducted through port 107 of servo valve 25 and through port 121 of servo valve 26 thus providing the motive force for moving the servo pistons.

After certain speed of motor 11 is obtained due to maximum angle setting of swash plate 12 of pump 10 the vehicle speed can be further increased by decreasing the angle of swash plate 13 and thereby the displacement of motor 11. After manual lever 28 has been moved to approximately ¾ of its movement toward the forward position the contact portion 91 on actuating arm 82 will follow cam 80 and move toward the center of the cam thereby moving pilot piston 119 to the right to move swash plate 13 to the right to decrease the angle of the motor and increase the drive speed.

Whenever the manual lever is moved to the neutral position, servo piston 102 for swash plate 12 will be in a position connecting conduit 71 to the sump through ports 106 and 110 thus lowering the pressure behind pilot relief valve piston 181 which will allow the piston to move to the right giving the minimum relief valve setting which is insufficient to maintain vehicle motion. The same action may take place by manual actuation of foot pedal 194 which moves piston 196 of clutch 29 down to drain conduit 71 through passage 74 in to the sump 45 thus providing in effect a clutch mechanism similar in result to that of interrupting the drive line of a vehicle with a friction clutch being disengaged.

As the pressure builds up in conduits 70 and 73 the pilot relief valve will obtain its maximum pressure setting as determined by the stop 188 provided in the valve. Thus the maximum pressure obtainable in the transmission will be determined by the pilot relief valve in dependence upon its setting which may be varied by varying the position of the stop when the transmission is assembled. When the predetermined maximum pressure occurs within the transmission, the ball 186 will move off of the seat 182 and open port 183 to the sump thereby draining conduit 72 and, due to the operation of the restriction 72a, a pressure drop will occur in conduit 72 allowing relief valve 32 or 33 whichever is connected to the high pressure passage, to open and interconnect the high and low pressure passages between the pump and motor units until the pressure is relieved to an acceptable value at which time the pilot relief valve will close. Pressure will then once again build up behind the pistons of relief valves 32 and 33 and interrupt the connection between the high and low pressure passages between the pump and motor units.

Pilot relief valve 35 will also be effective to prevent a shock load occurring in the transmission if pedal 194 has been depressed and is suddenly released as for example if the operator's foot would slip off pedal 194. Since the pedal has been depressed piston 181 of relief valve 35 will be all the way to the right and ball 186 at its minimum pressure setting as explained above whereby it will be relieving pressure into conduit 187. When pedal 194 is suddenly released a rapid pressure increase will tend to occur in conduits 73 and 74. However, due to orifice 70a the pressure buildup in conduits 73 and 74 moving piston 181 to the left to increase the pressure relief setting of ball 186 will be gradual and a shock load within the transmission prevented.

The pressure compensator mechanism 27 may be utilized to have the transmission automatically adjusted to maintain thrust with the vehicle stalled, which can be an important and desirable feature in certain types of tractors and agricultural equipment. The pressure in conduit 70 is imposed on piston 134 of the compensating mechanism 27 through port 133 and when the desired pressure is exceeded the valve setting as determined by the size of the piston and the spring 134 will be such that the piston 134 will move to the right and thereby move pilot piston 103 to the right to decrease the pump angle and thereby reduce pump output flow to provide only that flow necessary to make up leakage and maintain set pressure.

The compensating valve mechanism 27 is an automatic mechanism for maintaining vehicle thrust through a certain position of angular movement of swash plate 12 and is not meant as a safety feature such as pilot relief valve 35. When sudden pressure rises occur within the transmission which would go much beyond the range of the setting of the compensating mechanism 27, the pilot relief valve 35 will open and relieve the pressure to an acceptable value before the compensating mechanism would do so.

In reverse operation the manual lever 28 is moved clockwise as labelled on the drawing which moves the over center swash plate of the pump unit 10 to the opposite side of neutral and in effect thereby makes the pump 10 pump pressure in the other direction making passage 62, for example, the high pressure passage.

Referring to FIGURE 2, a modified form of relief valve is illustrated. Relief valves 32 and 33 of FIGURE 1 are replaced by a single relief valve 205. Relief valve 205 includes a piston 206 urged to the left by a spring 207. Piston 206 is slidable within a bore 208.

Piston 206 has a large diameter 210 and a small diameter 211. The smaller diameter 211 is engageable with a seat 212 provided in bore 208. The bore 208 includes ports 215, 216 and 217.

Port 215 is connected to conduit 65, port 216 is connected to conduit 66, and port 217 is connected to conduit 72. The area of the front part of diameter 211 indicated at 211a is equal to the difference in area between diameters 211 and 210 so that a given pressure in port 216 acting on the differential area will impose a force on piston 206 tending to move the piston to the right equal to the same pressure in port 215 acting on area 211a.

The relief valve 205 will thus function in a similar manner to the relief valves 32 and 33 of FIGURE 1. When excess pressure is developed in either of conduits 65 or 66 the piston 206 will move to the right to interconnect conduits 65 and 66 until the pressure is relieved. As in the case of relief valves 32 and 33 main pump pressure is impressed on the rear area of piston 206 through conduit 72 and port 217 to vary the setting of the relief valve in dependence upon the main pump pressure.

From the above it will be apparent that the present invention includes an improved form of relief valve mechanism for a hydrostatic transmission in that the relief valve operates to initially allow the pump to operate under "no load" condition and then be loaded at a controlled rate and thereby preventing shock loads. Further, the relief valves 32 and 33 are of a simple construction and are variable acting relief valves in which the setting is dependent upon the pressure developed within the transmission itself.

Further, a pilot relief valve is used which is advantageous since the maximum setting of this valve may be easily adjusted to accommodate different types of installations for the transmission and further, it conveniently provides a means of having the relief valve interconnect the high and low pressure passages of the pump and motor units without requiring that maximum pump flow go through the relief valve 35. Thus relief valve 35 may be constructed with light springs and small passages thereby reducing the expense of manufacture of the transmission mechanism.

Various of the features of the invention have been particularly shown and described; however, it should be obvious to one skilled in the art that various modifications may be made therein without departing from the scope of the invention.

We claim:
1. A hydrostatic transmission including a pump and a motor, a pair of fluid pressure passages between said pump and motor either of which may be a high or low pressure passage depending on the direction of flow from the pump and direction of vehicle thrust, a sump for said transmission, a pair of relief valves for said transmission, each relief valve including a first port connected to one of said passages and a second port connected to the other of said pair of passages, a piston relief valve being movable to a position to block said first port and to a position to interconnect said first and second ports, a fluid conduit connected to each of said relief valves on the opposite side of said piston from said first port and being connected to each of said pair of fluid pressure passages through a pair of check valves whereby said conduit will contain fluid pressure equivalent to that in the high pressure fluid passage, said pressure in said conduit urging said pistons to their positions blocking said first port whereby initially at least one of said relief valves will be opened interconnecting the high and low pressure passage and as pressure developed by the pump builds up the pressure in said conduit will gradually urge said piston to close said first port whereby initially said high and low pressure passages are interconnected and close at a controlled rate to prevent shock loads.

2. A hydrostatic transmission as claimed in claim 1 including a pilot relief valve connected to said fluid conduit, said relief valve adapted to open at a predetermined value of fluid pressure to drain the fluid pressure imposed on said pistons of said relief valves on the side opposite of said first port whereby one of said relief valves will open to interconnect the high and low pressure passages between the pump and motor units to rapidly reduce fluid pressure when a predetermined maximum value is exceeded.

3. A transmission as claimed in claim 2 wherein said pilot relief valve includes a member blocking said fluid conduits from draining and a piston slidable to increase the load on said blocking member, said relief valve being connected to said fluid conduit whereby high pressure is imposed on said piston of said pilot relief valve whereby the setting of said pilot relief valve is varied in accordance with the limit of movement of said piston.

4. A transmission as claimed in claim 1 including a manual valve connected between said fluid conduit and the sump of said transmission, said valve being manually actuatable to drain said fluid pressure from said conduit thereby connecting said pump high pressure passage to the sump to interrupt operation of said transmission when said valve is manually actuated.

5. A hydrostatic transmission including a pump and a motor, a pair of fluid passages between said pump and motor either of which may be a high or low pressure passage depending upon the direction of flow from the pump and direction of vehicle thrust, a sump for said transmission, a relief valve for said transmission, said relief valve including a first port connected to one of said passages and a second port connected to the other of said pair of passages, a piston in said relief valve being movable to a position to block fluid flow between said first and second ports, a fluid conduit connected to said relief valve on the opposite side of said piston from said first and second ports and being connected to said pair of fluid pressure passages through a pair of check valves whereby said conduit will contain fluid pressure equivalent to that in the high pressure fluid passage, said pressure in said conduit urging said piston to its position blocking flow between said first and second ports whereby initially flow between said first and second ports will be permitted and as pressure developed by the pump builds up, the pressure in said conduit will gradually urge said piston to its blocking position whereby initially said high and low pressure passage are interconnected and will be blocked at a controlled rate to prevent shock loads.

6. A hydrostatic transmission as claimed in claim 5 wherein said piston has two pressure responsive portions of equal area each of said first and second ports being connected to one of said positions.

References Cited

UNITED STATES PATENTS

| 3,117,420 | 1/1964 | Young | 60—52 |
| 3,135,087 | 6/1964 | Ebert | 60—19 |
| 3,157,998 | 11/1964 | Harris | 60—53 |
| 3,187,509 | 6/1965 | Moon | 60—53 |
| 3,243,959 | 4/1966 | Fantom | 60—53 |

OTHER REFERENCES

ASAE Paper, June 20–23, 1965, "New Hydrostatic Drives for Garden Tractor," by D. B. Reinke.

Advertising Brochure from Lucas of England, pub. April 1963.

EDGAR W. GEOGHEGAN, *Primary Examiner.*